UNITED STATES PATENT OFFICE.

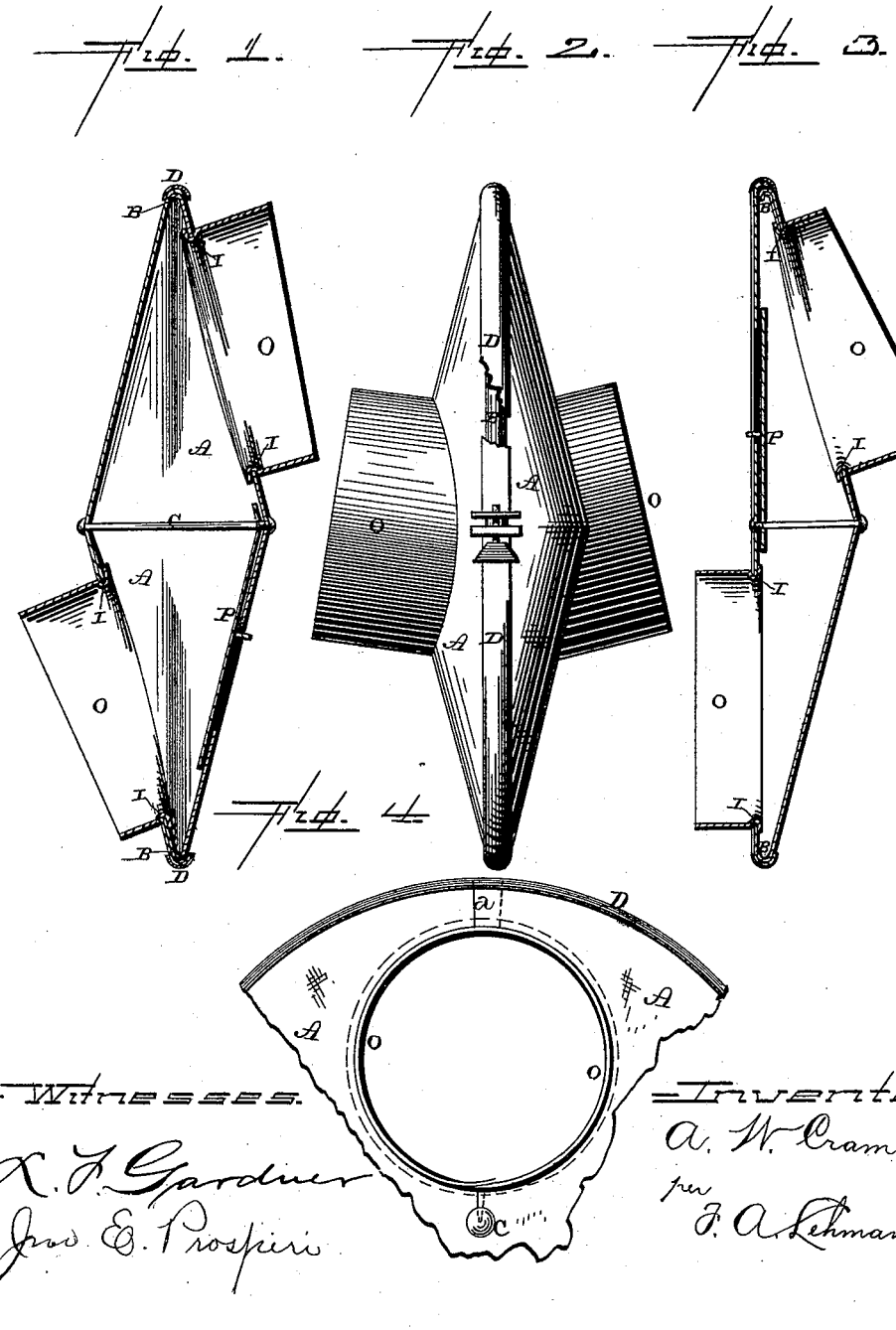

ALONZO W. CRAM, OF HAVERHILL, MASSACHUSETTS.

ELBOW FOR STOVE-PIPES.

SPECIFICATION forming part of Letters Patent No. 340,487, dated April 20, 1886.

Application filed May 18, 1885. Serial No. 165,878. (Model.)

*To all whom it may concern:*

Be it known that I, ALONZO W. CRAM, of Haverhill, in the county of Essex and State of Massachusetts, have invented certain new and useful Improvements in Elbows for Stove-Pipes; and I do hereby declare the following to be a full, clear, and exact description of the invention, such as will enable others skilled in the art to which it pertains to make and use it, reference being had to the accompanying drawings, which form part of this specification.

My invention relates to an improvement in elbows for stove-pipes; and it consists in, first, the combination of two conical or concavo-convex disks which are loosely held together by a band which is passed around their edges, and which permits either one or both of the disks to be turned for the purpose of adjusting the collars in relation to each other; second, an elbow which is composed of two disks, of suitable shape, which have their edges turned over so as to form flanges, and which are loosely held together by means of a band which passes around the edges, and a rod which passes through the two disks at their centers; third, the revolving collars which are attached to the two revolving heads or disks, and which collars can be adjusted independently of the disks, so as to stand at any desired angle thereto; fourth, the combination and arrangement of parts which will be more fully described hereinafter.

The object of my invention is to provide an elbow for stove-pipes in which the heads are made to revolve for the purpose of bringing the collars in any desired relation to each other, and which collars can be revolved upon the heads for the purpose of adjusting them to any desired angle of the stove-pipe.

Figure 1 is a vertical section taken through an elbow embodying my invention. Fig. 2 is a plan view of the same. Fig. 3 is a vertical section of an elbow having one conical or convex and one flat head. Fig. 4 is a detail view.

A represents the two heads or ends of an elbow, and which may be made either conical or concavo-convex, or one may be made conical or concavo-convex and the other flat, as may be preferred. The outer edges of the heads are turned over at a suitable angle, so as to form the flanges B, one of which fits inside the other. These flanges serve to strengthen the disks and to increase distance between them.

The heads or disks are secured together by a pivotal rod, C, which passes through their centers, and by a U-shaped band, D, which catches over their outer edges, as shown. Each end of the band is provided with a head or flange, which is turned outward at a suitable angle, and through which is passed a suitable clamping bolt or screw, for the purpose of drawing the two ends together, and thus holding the band in position.

The disks, while held together by both the pivotal rod and the U-shaped band, revolve freely upon each other, so that the collars O, to which the ends of the stove-pipes are attached, can be brought into any desired relation to each other. Either head can be revolved alone, or both can be turned at the same time, as may be found necessary.

Cut through each of the heads is a circular opening, through which the inner end of the collar O is passed. From this opening, through the edge of the disks, is cut a slit, *a*, as shown in Fig. 4, and then the ends upon opposite sides of this slit are made to overlap each other, for the purpose of contracting the opening after the end of the collar has been passed through it, and thus hold the collar in position.

Before the end of each collar is passed through the opening in the disk a groove, I, is made in the inner end of the collar, which groove extends entirely around the end of the collar. This groove in the end of the collar extends around the collar O in a plane at an angle to the axis of said collar, and serves to swivel the end of the collar upon the head or disk, so that the collar can be adjusted independently of the disk. Being thus constructed, the collar, when turned, extends in different directions from the face of the head to which it is attached at other than a right angle. Each collar can be turned freely upon its head or disk, so as to stand at any desired angle to the head, as may be required, to fit the stove-pipe. By this construction a compound movement is given to each one of the collars, as may be desired.

When the U-shaped band is slacked, the overlapping ends of the heads or disks will spring sufficiently apart to allow the collars to be removed without having to separate the head or remove the collar entirely.

Inside of the elbow and pivoted upon the pivotal rod is a suitable damper, P, which can be turned so as to admit air into the elbow, and at the same time partially shut off the draft through the stove-pipe. This damper is made to correspond to the shape of the head or disk to which it is applied, so as to fit closely against its inner side, and thus form a tight joint.

Having thus described by invention, I claim—

1. An elbow for stove-pipes, composed of two heads or disks, one of which is concavo-convex, and a rod connecting said disks, in combination with a U-shaped band or coupling and the collars which are connected to the heads, substantially as shown.

2. An elbow for stove-pipes, composed of two disks, one of which is concavo-convex and each having their outer edges turned at an angle, so as to form suitable overlapping flanges, the rod C, which passes through their centers and connects them together, and the collars O, which are attached to the heads, substantially as described.

3. An elbow for stove-pipes, composed of two disks or heads, one of which is concavo-convex, and which have their outer edges turned at an angle, so as to form suitable overlapping flanges, a suitable band or coupling which extends around the outer edges of the heads and is provided with a means for tightening it in position, and the collars which are attached to the heads, substantially as described.

4. In an elbow for stove-pipes, the combination, with the collars O, provided with grooves at their inner ends, which grooves extend entirely around the collars at other than a right angle to their axes, of the two heads, one of which is concavo-convex and each provided with an opening in which the collars O are swiveled by their grooves, whereby they can be revolved and made to stand at different angles to the heads, substantially as set forth.

5. In an elbow for stove-pipes, the combination of the two heads A, one of which is concavo-convex, bolt C, band D, and collars O, provided with grooves at their inner ends which extend entirely around the collars at other than a right angle to their axes, and which collars are swiveled in the heads, substantially as specified.

6. The combination of the heads A, provided with openings to receive the collars, and slits leading from the openings, a band for securing the heads together, a tightening device for the band and the collars which are held in the openings in the heads, substantially as shown.

In testimony whereof I affix my signature in presence of two witnesses.

ALONZO W. CRAM.

Witnesses:
FRED. L. CRAM,
W. D. CRAM.